United States Patent [19]
Donnelly et al.

[11] 3,969,533
[45] July 13, 1976

[54] PROCESS FOR THE MANUFACTURE OF A SOLUBLE COFFEE PRODUCT

[75] Inventors: John G. Donnelly, Hasbrouck Heights, N.J.; George E. Livingston, Malverne, N.Y.

[73] Assignee: General Foods Corporation, White Plains, N.Y.

[22] Filed: Dec. 11, 1973

[21] Appl. No.: 423,862

[52] U.S. Cl. ............................ 426/432; 426/519; 426/665
[51] Int. Cl.² .......................................... A23F 1/08
[58] Field of Search .......... 426/519, 384, 385, 432, 426/434, 388, 443, 446, 665

[56] References Cited
UNITED STATES PATENTS

| | | | |
|---|---|---|---|
| 1,152,456 | 9/1915 | Vogelsang | 426/388 |
| 1,400,484 | 12/1921 | Gould | 426/388 |
| 2,520,939 | 9/1950 | Kowalewski et al. | 426/384 |
| 2,557,294 | 6/1951 | Kellogg | 426/388 X |
| 2,915,023 | 12/1959 | Rapaport | 426/519 X |
| 3,244,533 | 4/1966 | Clinton et al. | 426/385 |
| 3,373,042 | 3/1968 | Elerath et al. | 426/385 |
| 3,598,608 | 8/1971 | Ganiaris | 426/384 |
| 3,684,532 | 8/1972 | Gottesman et al. | 426/384 |

OTHER PUBLICATIONS

*Cosmetic–Science and Technology,* pub. 1957, by Interscience Pub. Co., N.Y. TP983525C, pp. 1022–1023.
*Food Industries* – Modern Industries-Modern Food Mixing, Nov. 1949, vol. pp. 1577–1586 by Frank W. McCarthy (pp. 78–88).
*Coffee Processing Tech.* by Sivetz and Foote, vol. 1, pp. 306–307 published 1963 by Avi Pub. Co., Westport, Conn.
*Coffee Processing Tech.* by Sivetz vol. 2, pp. 147–148 published 1963 by Avi Pub. Co. Westport, Conn.

*Primary Examiner*—Frank W. Lutter
*Assistant Examiner*—N. Greenblum
*Attorney, Agent, or Firm*—Thomas R. Savoie; Bruno P. Struzzi

[57] ABSTRACT

A process for manufacturing coffee extract is disclosed wherein an eductor is used to keep standing bodies of extract under sufficient agitation to prevent the coalescing and settling-out of insoluble materials contained in the extract.

7 Claims, No Drawings

PROCESS FOR THE MANUFACTURE OF A SOLUBLE COFFEE PRODUCT

BACKGROUND OF THE INVENTION

This invention relates to coffee and more particularly to the manufacture of soluble coffee.

The manufacture of soluble coffee generally begins with the production of a liquid coffee extract from roasted and ground coffee. A percolator set is normally employed which is a series of extraction columns filled with roasted and ground coffee. An aqueous extraction liquid, generally water, is used to extract the water soluble constituents from the roasted and ground coffee. The percolation process is semi-continuous in that the extraction liquid flows continuously through the extraction columns while the roasted and ground coffee moves batchwise from one cycle to the next, and the extraction liquid is flowed countercurrent to the batchwise movement of the coffee being extracted.

Coffee extract drawn off from the percolator set is generally at a concentration of 20 to 35% soluble coffee solids by weight. This extract is then further processed to dry soluble coffee powder by a number of well-known prior-art processes. Thus, for example, the extract may be passed directly to a spray-drier wherein it is dried to a powder; the extract may be first concentrated to a higher solids content before drying; the extract may be freeze-dried or first concentrated, preferably freeze-concentrated, prior to freeze-drying; the dried powder may be agglomerated before packaging either alone or together with another dry form; various aromas may be removed from the extract and subsequently reincorporated into the dry powder; and other like processes.

Coffee extract is known to contain insoluble or difficultly soluble constituents extracted from the roasted and ground coffee during percolation and usually during the autoclave or hydrolysis portion of the percolation process. These constituents may result in plugging of certain pipe orifices and more importantly may be carried into the final dried powder such that upon reconstitution, specks of insoluble matter appear in the cup, a situation found to be detrimental to consumer acceptance of the product.

Prior art workers, in recognizing this problem, have resorted to varied means of solution. Extract strainers consisting of a porous screen designed to "catch" the insoluble material when the coffee extract is flowed through them have generally proven to be unsuccessful. More commonly, a centrifuge is employed which, while effectively removing the insoluble material also removes valuable coffee solids which may be associated therewith making this method, to some extent, uneconomical. Further, the centrifuge apparatus will usually be quite expensive and require constant cleaning.

The primary object of this invention is to provide a soluble coffee process whereby the final reconstituted coffee product does not contain an undesirable amount of noticeable insoluble or difficultly soluble material.

A further object of this invention is to achieve the aforementioned condition without the need for removal of insoluble or difficultly soluble material from the coffee product.

SUMMARY OF THE INVENTION

These and other objects are achieved through a process which involves agitating the coffee extract whenever it is in a standing position. The agitation is designed to permit insoluble or difficultly soluble material contained in the extract to remain suspended therein. In accordance with the process of this invention, the agitation is achieved by recirculating extract contained in a storage vessel through a jet pump otherwise known as an eductor or ejector.

The insoluble or difficultly soluble material contained in coffee extract drawn off from the percolator set is of a minute, almost microscopic size. It is found that if the coffee extract is flowed continuously through suitable piping from the percolator to the drying apparatus, the eventual dry soluble coffee powder, upon reconstitution, does not exhibit any noticeable "specks" owing to the microscopic size of the particles. In point of fact, these particles are desirably present in the final cup of coffee since they contribute to the overall coffee flavor and aroma.

The commercial manufacture of soluble coffee, however, necessitates holding-up the coffee extract drawn off from the percolator set at various points prior to the eventual drying operation. Such hold-up is necessitated by virtue of the fact that the quantity of extract must be weighed at various points in the process and more importantly that the drying operations cannot be exactly coordinated with the coffee extract production.

The minute insoluble material while not troublesome when the extract is continuously flowed, and not in and of itself of sufficient size to cause specks in the final product, is found to coalesce when the extract is "standing" in some suitable storage vessel. It is believed that these minute particles have a certain affinity for each other which causes them to agglomerate and form larger sized particles. Due to their increased weight and size, the particles tend to settle out of standing extract causing numerous problems. If these particles are not separated from the standing extract and passed along with it to the drying operation, the reconstituted powder will exhibit noticeable specks which are undesirable. If these large particles are removed from the coffee extract prior to drying via centrifugation, decanting, filtration and like methods, significant operating losses are encountered because these particles will have coffee extract associated therewith. Furthermore, some of the natural flavor and aroma contribution of the insoluble material will be lost.

We have found that by agitating the coffee extract within the storage vessels it is possible to keep this minutely-sized material from coalescing thereby precluding the buildup of larger sized particles. By so doing, the need for separating particles from the extract is obviated eliminating separation equipment, preventing the loss of extract associated with the particles and preserving their flavor and aroma contribution in the final product. Moreover, by keeping the material in its minutely-sized state, no insoluble specks are noticeable in the final cup of coffee.

While the present invention broadly deals with agitation of the coffee extract whenever it is in a storage vessel where it would otherwise be standing, we have found that only a particular agitation process is entirely successful in this respect. Classical agitators such as stirrers, when operated at rates sufficient to keep the insoluble material from coalescing, have the disadvantage of producing an undesirable amount of foam in the coffee extract. This foam is caused by a combination of whipping air into the extract and also by releasing occluded gases contained in the extract. The foam produced is extremely stable which hampers further processing and may appear as an unsightly foam in the finally reconstituted beverage.

The key to the present invention resides in agitating the coffee extract in holding or storage vessels by means of jet pump otherwise known as an eductor or ejector. The process of this invention achieves a sufficient degree of agitation to prevent insoluble material from coalescing without the creation of any significant amount of stable foam.

In the manufacture of soluble coffee powder wherein coffee extract obtained from the extraction of roasted and ground coffee is transported to one or more storage or holding vessels wherein the coffee extract would be otherwise stagnant or standing, and then passing the extract from the storage vessel to a suitable drying operation, this invention comprises agitating the coffee extract within the storage vessel by recirculating the coffee extract through an eductor at rates sufficient to prevent coalescing of the minutely-sized material contained in the extract.

DETAILED DESCRIPTION OF THE INVENTION

Coffee extract is obtained from the countercurrent extraction of soluble coffee solids from roasted and ground coffee in the well-known process of percolation. The coffee extract obtained will generally be at a concentration of between 20 to 35% soluble coffee solids by weight and contains amounts of insoluble or difficultly soluble material of a minute particle size.

The coffee extract is processed to dry soluble coffee powder according to various art-recognized methods. Where spray-drying is employed, the coffee extract will typically be drawn-off from the percolator set at about 190° F and transported through suitable piping to an extract storage vessel which accumulates a pre-determined portion of coffee extract. The extract is then passed to the spray-drying process and may be again held-up in vessels at this point depending upon the capacity of the spray-drier and the coordination of the entire process. The dry soluble coffee powder resulting from the spray-drying process is then packaged either with or without the overt addition of aroma-enhancing materials. The coffee extract may be concentrated prior to spray-drying if desired.

Where freeze-drying is employed, the coffee extract is typically drawn-off at the lowest possible temperature and transported to a holding or storage vessel. From here, the extract is generally concentrated to a higher solids content, preferably by freeze-concentration, and then frozen and freeze-dried (the direct sublimation of water vapor from the solid ice state). Various processes such as foaming with an inert gas to decrease the density of the final product, the overt addition of aromas, and the like, may also be employed according to well-known prior art methods.

The key to this invention resides in agitating the coffee extract whenever it is kept for any period of time as a standing stagnant body whereby the formation of large insoluble particles is enhanced. The agitation is achieved by the use of an eductor through which the coffee extract contained in the vessel is recirculated. The process of this invention is applicable to any soluble coffee process be it spary-drying, freeze-drying, or other like methods, and whether the extract is concentrated or eventually concentrated, whether aromas are added, and the like.

The description which follows describes in more detail the process of this invention as it relates to the production of spray-dried soluble coffee powder, and constitutes our preferred embodiment. However, as mentioned previously, it will be apparent that this invention is applicable to any process wherein coffee extract would otherwise be kept in a standing stagnant state.

An eductor is a jet-pump normally used for transporting liquid materials. An example of the design of an eductor can be found in *Perry's Chemical Engineer's Handbook*, 6 – 13, 14 (McGraw-Hill 1963) incorporated herein by reference. The eductor is also known as an ejector and is broadly termed a jet pump. The eductor basically comprises a chamber housing a venturi nozzle. In operation, the eductor is submerged in a body of the fluid which is to be transported. A pumping fluid, which in typical prior art applications of the eductor is not the same as the fluid desired to be pumped, enters the eductor inlet port and passes through the venturi nozzle and out the discharge opening of the eductor. As the pumping fluid passes into the venturi nozzle it develops a suction which causes the fluid to be transported to be taken up into the venturi nozzle and entrained with the pumping fluid and then passed out through the discharge port of the eductor.

We have found that the eductor is a simple effective means for maintaining agitation within a standing body of coffee extract sufficient to prevent the minute-sized particles suspended in the extract to coalesce and group together into large insoluble clusters. The use of the eductor in this process, however, is not attended with the creation of any significant amounts of foam.

According to the process of this invention, coffee extract drawn off from a percolator set is transported to a storage vessel which accumulates a pre-determined amount of coffee extract. Coffee extract is drawn off from this vessel and pumped back into the vessel through the eductor submerged in the body of extract. This recirculated extract as it passes into the venturi nozzle section of the eductor creates a suction which draws coffee extract contained in the vessel into the venturi from which it and the recirculating extract mix and discharge from the eductor. The suction and discharge of the coffee extract together with the force of the stream issuing from the discharge port of the eductor impinging on the body of extract in the vessel results in an overall agitation of the contents of the vessel.

The recirculation of coffee extract through the eductor may be performed intermittently or continuously depending only upon the degree of agitation needed to keep the insoluble material from coalescing and the degree of agitation achieved by each recirculation. It is noted, however, that leaving the extract unagitated for too long a period of time will cause material to coalesce, which material cannot be broken down even by further agitation.

In order to insure that the extract achieves a sufficiently agitated state in which insoluble material will not coalesce requiring removal or carrying it through the process, it is preferred to continuously recirculate the coffee extract. Thus in this embodiment, extract is fed from the percolator set to a storage vessel. As the extract is filling the vessel, a predetermined quantity is drawn-off from the vessel, generally from the bottom, and is readmitted to the vessel through the eductor to agitate the contents of the vessel. This recirculation of coffee extract is continuously maintained.

Depending upon the degree of coordination between the extract production operation and the drying process, any number of alternative modes of further operation can be practiced. Typically, the vessel is filled to some pre-determined weight of extract nearing the capacity of the vessel, extrace draw-off and recirculation through the eductor being kept up in a continuous manner. When it is desired to pass the extract contained in the vessel to further processing such as drying or steps preparatory to drying, extract is drawn-off from the vessel and this drawn-off is split in two streams, one of which is passed to further processing, the other stream being recirculated to the vessel through the eductor to keep the vessel contents agitated while the vessel is being drained. The process proceeds in this continuous manner, that is, removing extract from the vessel, sending a portion to further processing, and recirculating the remaining portion into the vessel through an eductor until the volume of the storage tank is depleted. Alternatively, this operation can be coordinated with the percolation system such that coffee extract is continuously drawn-off from the percolators and transported to the vessel while the vessel is being simultaneously agitated and drained. Alternatively, the recirculation of extract can commence as the vessel is being filled with a portion of the extract drawn-off from the vessel being sent to further processing and the remaining portion being readmitted to the vessel.

It is desirable to orient the eductor at the lowest practical point in the vessel since the suction and discharge ports of the eductor must be submerged in the body of extract before extract can be recirculated through it. Otherwise, the extract passing through the eductor would impinge directly upon the vessel walls causing excessive foaming instead of causing agitation of the extract in the vessel. If the suction port is not submerged of course, no extract will be drawn into the venturi. Even if the eductor were pointed such that extract issuing therefrom would impinge upon a body of extract below the discharge port, foaming will generally occur. Furthermore, as will be pointed out, directing the discharge stream in a downward direction generally fails to adequately agitate the contents of a large commercial-sized vessel.

It is preferred, then, to position the eductor at some lower point in the storage vessel such that agitation of entering extract can be commenced as early as possible and agitation of exiting extract can be terminated as late as possible, that is, the eductor stays submerged as long as possible as the vessel is drained. In commerical operation where large bodies of extract are contained in the storage vessel it is usually desirable, especially where the eductor is located as low as possible in the vessel, to orient the eductor such that the force of the discharge therefrom reaches the upper extremeties of the body of extract. This can generally be accomplished by directing the discharge port of the nozzle at some suitable angle, say of about 45° from horizontal. Less severe angles can of course be employed if desired and where necessary as may more severe angles. In this manner efficient agitation of the entire body of extract within the vessel is enhanced.

When the eductor is oriented in such a manner it is often desirable to allow the eductor to become more than "just" submerged before starting up the draw-off and recirculation system. If this is not done, the force of the extract discharging from the eductor may be sufficient to spray the body of extract which can lead to foam and more importantly to extremely troublesome inefficient operation. As the severity of the angle of orientation increases, the weight of extract needed to prevent spraying will generally increase.

The time during filling of the extract vessel and beginning the recycle of extract when the entering extract submerges the eductor, is usually not of a long enough duration to cause coalescing of the insoluble material. The same is true of the time duration between termination of recirculation and complete emptying of the storage vessel through take-off lines.

The particular size of the eductor is of course not critical to this invention so long as it is capable of creating sufficient agitation within the extract body to prevent coalescing of the minute-sized insoluble particles. The size of the eductor will depend, then, on the amount of extract to be agitated and the capacity of the particular eductor employed. Thus, for example, we have found that a 60 gallon/minute capacity eductor is sufficient for keeping a 3,000 to 3,500 pound body of extract in a sufficient state of agitation to prevent coalescing. The 60 gallon capacity is the result of recirculating 15 gallons/minute of coffee extract through the eductor the suction created thereby pulling 45 gallons/minute of extract contained in the vessel into and through the venturi portion of the eductor.

The determination of the actual capacity of the eductor required is believed to be well within the skill of workers in this art. The above figures may be used as a rule of thumb and can be extrapolated for varying coffee extract weights within the vessel.

The process of this invention is illustrated by the following example.

A coffee extract was obtained from a percolator set operating at column loads of about 1800 pounds. Coffee extract was drawn off from the fresh stage extraction column for 16 minutes at a temperature of between 175° to 200°F. The total weight of coffee extract was about 3500 pounds and the average concentration was 26 – 27% soluble coffee solids by weight. This coffee extract was passed through a heat exchange apparatus to cool the extract to 80° – 100°F from which it was continuously fed to a scale tank 46 inches in diameter and 100 inches in height. The scale tank was fitted with a fluid-operated eductor made of stainless steel (manufactured by the Penberthy Co.). The orifice size was three-eighths inch C.T.E. (Center Threaded End). The eductor entered the storage vessel from the side about 2 feet from the bottom of the vessel, and was inclined at an angle of 45° from horizontal.

When the weight of coffee extract in the vessel reached 700 lbs., 15 gallons/minutes of coffee extract was drawn off from the bottom of the vessel and was pumped under a pressure of 20 psig through the eductor apparatus. The suction created by the extract input took up 45 gallons/minute of coffee extract into the venturi portion of the eductor and the resultant 60 gallons/minute issued from the discharge port of the eductor. The sucking up of the coffee extract contained in the vessel together with the force of the discharge stream created a visible degree of agitation throughout the entire body of extract.

When the weight of coffee extract in the vessel reached about 3500 pounds, the draw-off from the vessel was increased to 45 gallons/minute. Fifteen gallons per minute of this draw-off continued to be recirculated to the vessel through the eductor, the remaining 30 gallons/minute being sent to further processing. The draining of the vessel continued in this manner until the weight of extract in the tank reached 700 pounds at which point recirculation was discontinued and the remaining contents of the vessel was sent to further process.

The extract was pumped to another hold-up vessel which employed identical conditions as those maintained in the scale tank. The extract drawn off from this tank was then passed to a spray-dryer.

No significant amounts of foam were encountered throughout the agitation process. The spray-dried powder was reconstituted in hot water and was found to contain no visible specks of insoluble material. Expert tasters found the coffee to have a good natural aroma and flavor.

Runs wherein the extract was allowed to stand in the vessels was conducted. Where centrifuging was employed, soluble solids losses were on the order of 1.0 to 2.0%. Where no centrifuge or other separation was employed, the final reconstituted beverage contained a noticeable amount of insoluble material.

The present invention, then, provides a process for keeping insoluble materials in the coffee extract without their coalescing and setting out. By virtue of this invention, the need for separation means such as centrifuges can be eliminated with the result that no solids losses are experienced. Furthermore, the eductor process does not create any appreciable foam problem as is the case with the more typical types of agitators such as blade agitators. Certain types of agitators such as propeller agitators which employ a series of baffles within the vessel to avoid vortices which lead to foaming or which employ pitched blades for a similar purpose are found to still create too much foam for use in the manufacture of coffee extract.

As earlier indicated, the process of this invention is applicable to any soluble coffee process wherein extract is kept in a standing state for any appreciable amount of time sufficient to cause insoluble material to coalesce. While the more detailed portion of this invention has been described with respect to a spray-dried soluble coffee product it is apparent that the process of this invention is applicable to any type process including any number of well-known intermediate processing steps. In particular, skilled workers in this art will appreciate the applicability of this invention to a freeze-drying process since lower temperatures tend to enhance coalescing and settling and further since solids losses via insoluble separation tend to be greater in such a process.

While specific examples and operating conditions have been employed in the description of the invention they are intended to be merely illustrative of the preferred mode of practicing this process. Variations and modifications are believed attainable by those skilled in this art without departing from the scope and spirit of this invention as defined by the appended claims.

We claim:

1. In the process of manufacturing soluble coffee powder wherein coffee extract obtained from the extraction of roasted and ground coffee is transported to a storage vessel and then passed to a drying operation, the improvement comprising agitating the coffee extract within said storage vessel by recirculating the coffee extract through an eductor submerged in the coffee extract at rates sufficient to prevent coalescing of the insoluble material contained in said extract.

2. A process for manufacturing soluble coffee powder, comprising the steps of:
   a. obtaining a coffee extract from the percolation of roasted and ground coffee;
   b. transporting said extract to a storage vessel;
   c. drawing off a portion of coffee extract from said vessel and readmitting it to the vessel through an eductor submerged in the extract contained in said vessel to maintain a degree of agitation in the coffee extract sufficient to keep the insoluble material suspended therein; and
   d. thereafter drying said coffee extract.

3. The process of claim 2 wherein the drawing off of extract in step (c) is commenced after a pre-determined weight of coffee extract is contained in said vessel.

4. The process of claim 3 wherein only a portion of the extract drawn off from said vessel is readmitted to said vessel through an eductor, and wherein the remaining portion of coffee extract drawn-off is further processed to soluble coffee powder.

5. The process of claim 4 wherein said readmitting of coffee extract to said vessel is terminated after a pre-determined weight of coffee extract remains in said vessel.

6. The process of claim 5 wherein step (d) comprises spray-drying.

7. The process of claim 5 wherein step (d) comprises freeze-drying.

* * * * *